United States Patent
Laliron et al.

(10) Patent No.: US 8,738,235 B2
(45) Date of Patent: May 27, 2014

(54) DETECTION METHOD FOR A MOTOR VEHICLE

(75) Inventors: Anne Laliron, Jouars Pontchartrain (FR); Caroline Robert, Paris (FR)

(73) Assignee: Valeo Vision, Bobigny (FR)

( * ) Notice: Subject to any disclaimer, the term of this patent is extended or adjusted under 35 U.S.C. 154(b) by 278 days.

(21) Appl. No.: 13/009,916

(22) Filed: Jan. 20, 2011

(65) Prior Publication Data
US 2011/0184610 A1 Jul. 28, 2011

(30) Foreign Application Priority Data

Jan. 22, 2010 (FR) ...................................... 10 50433

(51) Int. Cl.
*H04N 7/18* (2006.01)
(52) U.S. Cl.
USPC ............... 701/49; 362/37; 362/464; 362/466; 362/467; 362/469; 348/118
(58) Field of Classification Search
USPC .................... 701/49, 301; 340/435, 436, 437; 318/77, 82; 362/37, 464, 466, 467, 362/469; 348/118
See application file for complete search history.

(56) References Cited

U.S. PATENT DOCUMENTS

| 5,121,200 | A * | 6/1992 | Choi ............................. 348/148 |
| 6,990,397 | B2 * | 1/2006 | Albou et al. ..................... 701/49 |
| 7,429,120 | B2 * | 9/2008 | Sugimoto ....................... 362/466 |
| 7,595,634 | B2 | 9/2009 | Flandre et al. |
| 7,792,621 | B2 * | 9/2010 | Sugimoto et al. ............... 701/49 |
| 2004/0212484 | A1 * | 10/2004 | Su et al. .......................... 340/435 |
| 2007/0244655 | A1 | 10/2007 | Flandre et al. |
| 2008/0106886 | A1 * | 5/2008 | Sugimoto et al. ............... 362/37 |
| 2008/0247177 | A1 * | 10/2008 | Tanaka et al. .................. 362/373 |

FOREIGN PATENT DOCUMENTS

| DE | 19950033 | A1 * | 5/2001 | |
| EP | 1500557 | A1 | 1/2005 | |
| FR | 2785434 | A1 * | 5/2000 | ........... G08G 1/0968 |
| FR | 2898092 | A1 | 9/2007 | |
| FR | 2899967 | A1 | 10/2007 | |
| JP | 10264723 | A | 10/1998 | |
| JP | 2005088630 | | 4/2005 | |
| JP | 2005088630 | A * | 4/2005 | ................ B60R 1/00 |

* cited by examiner

*Primary Examiner* — Thomas Black
*Assistant Examiner* — Peter D Nolan
(74) *Attorney, Agent, or Firm* — Jacox, Meckstroth & Jenkins

(57) ABSTRACT

A detection method, system and device for a motor vehicle (V1). The method, system and device uses at least one camera which has a predetermined field of vision. The method includes the following steps:

receiving information which is representative of a driving state associated with the vehicle; and modifying the field of vision of the camera, and in particular its orientation, according to the information.

13 Claims, 2 Drawing Sheets with DBL / camera associated with the movement of the DBL platform without DBL with DBL / fixed camera with DBL / camera associated with the movement of the DBL platform

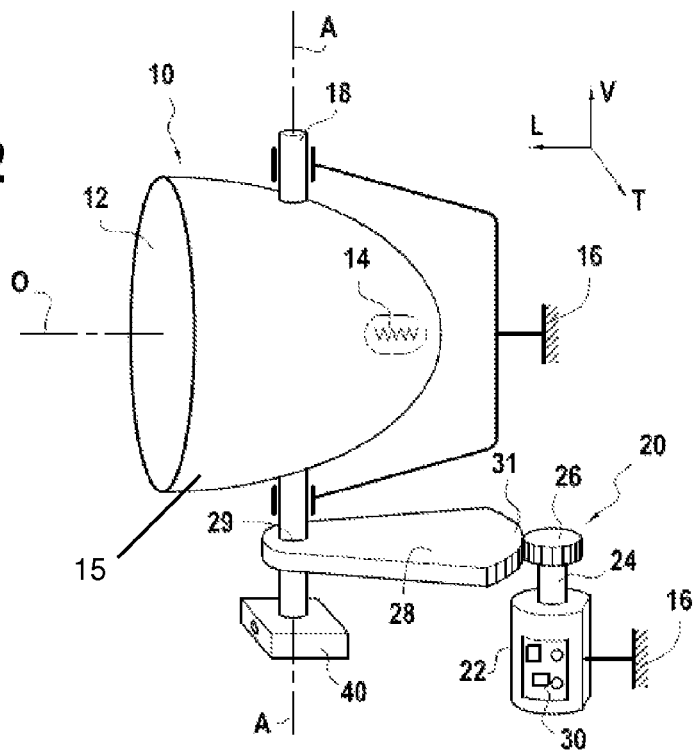
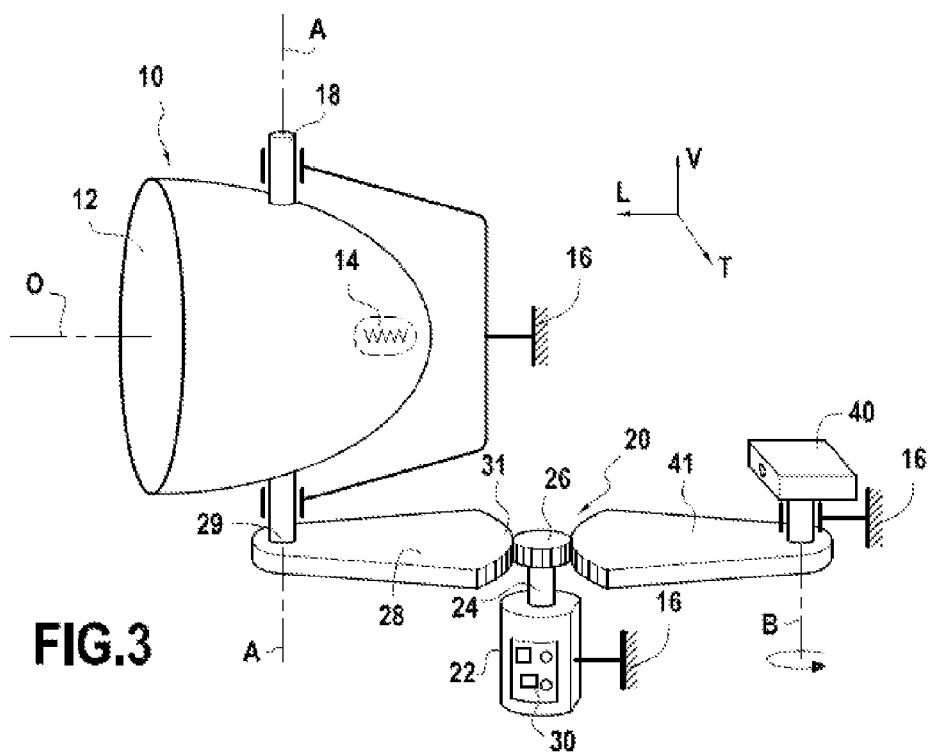

DETECTION METHOD FOR A MOTOR VEHICLE

CROSS-REFERENCE TO RELATED APPLICATIONS

This application claims priority to French Application No. 1050433 filed Jan. 22, 2010, which application is incorporated herein by reference and made a part hereof.

BACKGROUND OF THE INVENTION

1. Field of the Invention

The invention relates in particular to a detection method for a motor vehicle.

2. Description of the Related Art

In the field of driving assistance, a plurality of functions have arisen. These require as sensors cameras which can analyze the scene, and these functions thus provide assistance in making a decision, or permit automation of certain tasks which had hitherto been the responsibility of the driver of the vehicle.

Reference can be made for example, non-exhaustively, to the automation of the high-beam/low-beam function, parking assistance functions, adaptive lighting functions, and detection of lines on the ground.

In these different cases, and for each application, the field of vision of the camera is adapted to the situation.

However, in view of the increasing concern for reduction of costs, and for standardization, motor vehicle manufacturers would like the sensors to be in common. This multi-functionality involves compromises in terms of the field of vision. The field of vision selected is the best compromise between the needs of each application.

This compromise may not eliminate all the contradictions, and some functions are then downgraded in terms of performance.

In addition, the solution to some functions has now been found in the form of use of specific sensors (for example: the front side view application provided by a front corner camera).

Also in a concern for reduction of the costs, it is advantageous to propose solutions for this type of application which would use existing sensors, i.e., which already carry out other functions in the vehicle.

Finally, some functions still do not have technical solutions, or have weaknesses which can be improved.

A headlight which is fitted such as to rotate around a vertical axis is also known from patent FR 2 899 967, which is equivalent to U.S. Pat. No. 7,595,634, which is incorporated herein by reference and made a part hereof.

What is needed, therefore, is an improved system and method for detection which improves driving of the vehicle.

SUMMARY OF THE INVENTION

One object of the present invention is in particular to respond to the various above-described needs, for example, by putting several items of equipment of the vehicle in common.

Another object of the invention is in particular a detection method for a motor vehicle, this method using at least one camera which has a field of vision, this method comprising the following steps:

receiving information which is representative of a driving state associated with the vehicle; and modifying, preferably automatically, a field of vision of the camera, and in particular its orientation, according to the information.

The field of vision of the camera can be formed by a solid angle (or cone of perception) defined by the orientation of an optical axis of the camera and its viewing angle.

The field of vision defines in particular the target space of the camera, i.e., the area of perception of the camera.

A base of the solid angle can be for example rectangular.

According to an embodiment of the invention, information which is representative of a driving state associated with the vehicle is selected from amongst: vehicle cornering information, information on the type of environment of the vehicle (this type of environment being able to be for example urban, i.e., the vehicle is in a town, or rural, i.e., the vehicle is in the countryside), information about conditions of climate or brightness, or information about control of a flashing light of the vehicle.

If applicable, the information which is representative of a driving state associated with the vehicle is cornering information about the vehicle, selected from an angle on the vehicle steering wheel, or location data of the vehicle, such as GPS data.

Advantageously, the vehicle comprises a headlight which can emit a light beam, the orientation of which can be modified in order to follow a bend, and the orientation of the field of vision of the camera is modified according to the modification of the orientation of the beam of the headlight when at a bend.

If required, the camera is mobile simultaneously with displacement of the headlight, this displacement comprising, for example, of pivoting.

The headlight can be associated with a DBL device, in order to displace the beam at a bend, and the camera can be associated with the DBL device, whilst, for example, being fitted on this DBL device, or being physically connected to this DBL device.

According to an embodiment of the invention, the camera is fitted on an independent platform of the vehicle headlights, this platform being designed to permit movement of the camera relative to the vehicle. This platform is, for example, secured to the vehicle windscreen.

If applicable the information which is representative of a driving state associated with the vehicle is information about the speed of the vehicle, or information about the brightness of the environment.

Advantageously, the field of vision of the camera is modified, in particular its orientation, when the speed of the vehicle is below a predetermined threshold, in particular in order to widen visibility on one side of the road at least.

For example, at least two cameras are provided, and, when the speed of the vehicle is below a predetermined threshold, the orientation of the cameras is modified so that the respective fields of vision move apart from one another in order to widen visibility on both sides of the vehicle.

If applicable, the field of vision of the camera is modified when the vehicle location information indicates the presence of a complex urban environment around the vehicle, in particular in order to widen visibility on one side of the road at least.

If required, the angular clearance permitted by the camera is between 0 and 15° or between 0 and 30°.

Still another object of the invention is also a detection device for a motor vehicle, this device comprising at least one camera which has a field of vision, this device being designed to:

receive information which is representative of a driving state associated with the vehicle; and modify the field of vision of the camera, in particular its orientation, according to the information.

Advantageously, the device comprises a DBL device which is associated with a headlight of a vehicle, the camera being coupled kinematically to the DBL device.

BRIEF DESCRIPTION OF THE ACCOMPANYING DRAWINGS

The invention will be able to be better understood by reading the following detailed description of non-limiting embodiments of it, and by examining the attached drawing, in which:

FIGS. 2 and 3 represent, schematically and partially, in perspective, devices according to two embodiments of the invention.

DETAILED DESCRIPTION OF THE PREFERRED EMBODIMENTS

Night-Time Context

An application specific to night-time is known, which consists of automation of the lighting, that is, an application which makes it possible to tilt from the low-beam light to the high-beam light or vice versa, according to vehicles which are potentially arriving opposite and which vehicles are detected automatically by a camera.

Figure 1A:
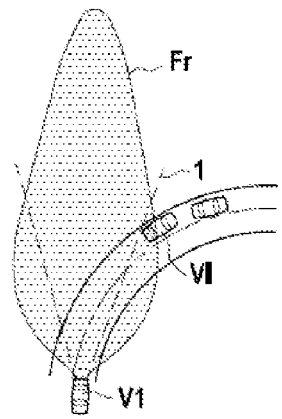
FIG. 1A represents, schematically and partially, the situation on the road of a vehicle which is equipped with a camera according to the prior art, without a rotary headlight.

In certain cases of very tight bends, it has been shown that vehicles VI which are passing the vehicle V1 which is equipped with the lighting automation function can be in the high beam Fr of the headlights of V1, and not be in the field of vision 1 of the camera 40 for a very short period of time (see FIG. 1A).

Figure 1B:
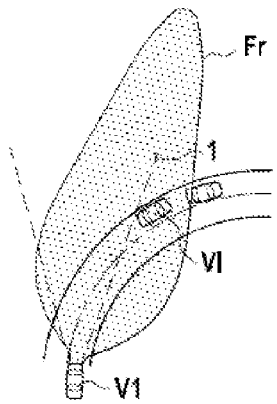
FIG. 1B represents, schematically and partially, the situation on the road of a vehicle which is equipped with a camera according to the prior art, with rotary headlights or DBLs.

The vehicles VI are in a situation of potentially being dazzled, which is reinforced by the action of a DBL (Dynamic Bending Light) device, as illustrated in FIG. 1B.

In this example in FIG. 1B, the camera is fixed, that is, it cannot pivot relative to the vehicle.

Figure 1C:
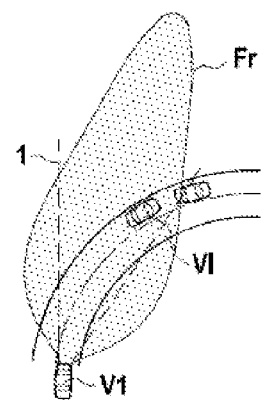
FIG. 1C represents, schematically and partially, the situation on the road of a vehicle which is equipped with a detection device according to the invention, with rotary headlights or DBLs.

In contrast to FIGS. 1A and 1B, the DBL device in a motor vehicle headlight of the embodiment shown in FIGS. 1C and 2-3 makes it possible to make an optical module pivot within the headlight.

The optical module can be of a low-beam light type and can pivot according to the trajectory which is being followed by the vehicle, in particular when the latter is cornering, in order to obtain a so-called "bending beam" or DBL.

Association of the movement of the camera with that of the DBL device reduces this risk of dazzling (as illustrated in FIG. 1C).

According to all of the functions which are present in the vehicle V1, and in a non-limiting manner, a single camera is situated in the headlight on the passenger side or on the driver's side or two cameras are placed each in a headlight, or the camera is placed at the top of a windscreen W (FIG. 4) on a platform.

In the case of one or more cameras which are placed in the headlights, the cameras can be fitted directly on the DBL device or can be physically connected to this device, as will be seen in greater detail hereinafter with reference to FIGS. 2 and 3.

In the case of a camera at the top of the windscreen W, the movement of the camera is created by another platform which acquires information from the DBL device, or obtains directly the information concerning the steering wheel angle, which information controls the DBL device.

In general, all the information which is necessary for control of the movement of the DBL device, as well as the laws which govern this information, can be acquired by this platform.

In order to reduce the costs, it is possible to give precedence to implantation in the headlight(s), so as to benefit from the existing mechanical movement platforms.

Hereinafter in the description, there will be adoption on a non-limiting basis of a longitudinal, vertical and transverse orientation which is fixed relative to the motor vehicle bodywork, and is indicated by the trihedron L, V, and T in FIG. 2.

FIG. 2 shows a motor vehicle headlight 10 which in this case comprises a reflector 12, inside which a lamp 14 is fitted. The headlight 10 can emit a light beam according to an optical axis O with a globally longitudinal orientation.

The reflector 12 and the lamp 14 form an optical module 15.

The module 15 is fitted such as to rotate around a vertical axis A, relative to the bodywork 16 of the motor vehicle. For this purpose, the headlight 10 comprises, for example, two lower and upper journals 18 with the axis A.

The beam of the headlight 10 can thus be oriented according to a plurality of angular positions around the axis A, in a clearance interval which is delimited by two end angular positions.

Hereinafter in the description, a neutral angular position is defined, which corresponds to the angular position which the headlight 10 occupies when it lights the road according to the longitudinal axis L of the vehicle.

The neutral angular position occupies a median position in the clearance interval.

Thus, the optical axis O of the beam of the headlight 10 can pivot on both sides of the longitudinal axis L of the motor vehicle.

The headlight 10 is rotated by a DBL drive device 20, which in this case comprises an electric motor 22, for example a step-by-step or stepper motor, which comprises a rotary vertical shaft 24. The motor 22 is fitted fixed relative to the bodywork 16 of the motor vehicle. A pinion 26 is provided at a free upper end of the shaft 24.

The DBL drive device 20 also comprises a circular toothed sector 28 which extends on a horizontal plane in the form of a fan, from a top 29 to a toothed peripheral arc 31, with a top 29 forming a center of a peripheral arc 31.

A top 29 of the toothed sector 28 is fitted such as to rotate around the axis A, such that a toothed sector 28 is integral in rotation with the headlight 10. The teeth 31 of the toothed sector 28 are engaged with the teeth of a pinion 26, such that the motor 22 can rotate the headlight 10 by means of the toothed sector 28.

The DBL drive device 20 optionally also comprises a printed circuit board 30, which extends on a transverse vertical plane, and in this case is secured to the motor 22.

If required, the drive device 20 comprises at least two Hall-effect sensors which are provided on the printed circuit board 30.

With reference to the role of the sensors which make it possible to measure the angular position of the headlight beam in its clearance interval, reference can be made to patent FR 2 899 967, which is equivalent to U.S. Pat. No. 7,595,634, which is incorporated herein by reference and made a part hereof.

In the example in FIG. 2, the camera 40 is placed in the headlight 10, and is fitted directly on the DBL device 20, for example, integrally with the axis of pivoting A of the lighting module.

As a variant, as illustrated in FIG. 3, the camera 40 is placed in the headlight 10, and is physically connected to the DBL device 40, for example, by means of a toothed sector 41 that can rotate around an axis B, which, for example, is parallel to the axis A.

Town/Low Speed

Figure 4:
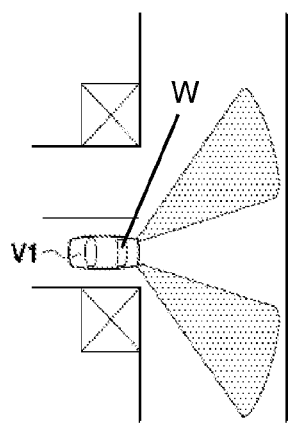
FIG. 4 represents, schematically and partially, a situation on an urban road of a vehicle which is equipped with a device according to another embodiment of the invention.

Within the context of driving in town, both by day and by night, the cameras which are coupled to the DBL device can also be used in order to improve the visibility at low speed when vehicles are passing one another. In fact, when approaching narrow crossroads, in town, it happens frequently that there is no visibility to the left and/or to the right. In the case for example of driving on a narrow road in town, the buildings which are on the right or the left of the road can make the visibility difficult at the approach to a crossing, as shown in FIG. 4.

The invention thus proposes to orient the cameras 40, in particular in the right and left headlights, by means of the DBL device, in order to widen the visibility on both sides of the crossing.

As soon as the vehicle is in town at low speed (information available in the vehicle, or speed information, or GPS information for example), the DBL devices can automatically be oriented towards the exterior, in order to widen the field of visibility. In town, at low speed, since the need for lighting is less great than on the road in the countryside (because of the exterior lighting), the fact of moving the light beams apart does not cause any problem.

It will be appreciated that, in order to be more efficient, this device requires putting into place of a machine interface, which makes it possible to inform the driver of the presence of an obstacle or a vehicle. A display screen in the vehicle can be an appropriate interface for providing the driver with this information. The two images (left and right cameras) can be coupled to the same screen.

The camera is advantageously associated with the movement of the DBL device, in order to follow the beam at night, or to increase the cover of visibility of the cameras by day.

The night-time and daytime functions can be made compatible.

It will be appreciated that the invention is not limited to the above-described embodiments.

For example, the mobility of the light beam can be assured by use of an FBL (Fixed Bending Light) device.

In this case, there is no movement which is specific to the headlight.

In a non-limiting manner, the beam can be modified in its orientation and form by the successive activation or deactivation of different sources of light (which can for example be LEDs), or by movement inside the headlight (for example movement of a shield which is mobile inside the headlight).

In this case, the movement of the camera can be controlled by information concerning activation of the FBL (for example information concerning the angle on the steering wheel, or GPS data).

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A detection method for a motor vehicle (V1), said method using at least one camera which has a predetermined field of vision, said method comprising the steps of:
receiving information which is representative of a driving state associated with said vehicle; and
modifying a field of vision of said at least one camera and its orientation in response to said information;
wherein said vehicle comprises a headlight which can emit a light beam, an orientation of which can be modified in order to follow a bend;
wherein said at least one camera is mobile simultaneously with displacement of the said headlight;
wherein said headlight is associated with a single mechanism that simultaneously displaces or moves said headlight and said camera to displace said light beam, and wherein said at least one camera is coupled to said mechanism by being at least one of fitted on said mechanism or directly coupled to said mechanism so that an orientation of said field of vision of said at least one camera is modified in response to a modification of said orientation of said light beam of said headlight.

2. The detection method according to claim 1, wherein said information which is representative of said driving state associated with said vehicle is selected from at least one of a vehicle cornering information, information on an environment of said vehicle, or control information about control of a flashing light of said vehicle.

3. The detection method according to claim 1, wherein said information which is representative of said driving state associated with said vehicle is cornering information about said vehicle, selected from an angle on said vehicle steering wheel, or location data of said vehicle, such as GPS data.

4. The detection method according to claim 1, wherein said at least one camera is fitted on an independent platform of said vehicle headlights, said independent platform being designed to permit movement of said at least one camera relative to said vehicle.

5. The detection method according to claim 1, wherein said information which is representative of said driving state associated with said vehicle is information about the speed of said vehicle, information about the brightness of the environment, or information about the location of said vehicle, such as navigation data.

6. The detection method according to claim 5, wherein said field of vision of said at least one camera is modified when the speed of said vehicle is below a predetermined threshold, in particular in order to widen visibility on at least one side of the road.

7. A detection method for a motor vehicle (V1), said method using at least one camera which has a predetermined field of vision, said method comprising the steps of:
receiving information which is representative of a driving state associated with said vehicle; and
modifying a field of vision of said at least one camera and its orientation in response to said information;

wherein said information which is representative of said driving state associated with said vehicle is information about the speed of said vehicle, information about the brightness of the environment, or information about the location of said vehicle, such as navigation data;

wherein said field of vision of said at least one camera is modified when the speed of said vehicle is below a predetermined threshold, in particular in order to widen visibility on at least one side of the road;

wherein at least two cameras are provided, and, when the speed of the vehicle is below a predetermined threshold, the orientation of said at least two cameras is modified so that the respective fields of vision move apart from one another in order to widen visibility on both sides of said vehicle.

8. The detection method according to claim 1, wherein said field of vision of said at least one camera is modified when the vehicle location information indicates the presence of a complex urban environment around said vehicle, in particular in order to widen visibility on at least one side of the road.

9. The detection method according to claim 1, wherein an angular clearance of said at least one camera is between 0 and 15° or between 0 and 30°.

10. A detection device for a motor vehicle, said device comprising at least one camera which has a field of vision, said device being designed to:
   receive information which is representative of a driving state associated with said vehicle; and
   modify the field of vision of said at least one camera, in particular its orientation, according to said information and in direct response to and simultaneously with movement of a headlamp;
   wherein said headlamp is associated with a single mechanism that simultaneously displaces or moves said headlamp and said camera to displace a light beam, and wherein said at least one camera is coupled to said mechanism by being at least one of fitted on said mechanism or directly coupled to said mechanism so that an orientation of said field of vision of said at least one camera is modified in response to a modification of said orientation of said light beam of said headlamp;
   wherein said vehicle comprises said headlamp which can emit a light beam, an orientation of which can be modified in order to follow a bend, and said orientation of the field of vision of said at least one camera is modified according to or in response to the modification of said orientation of said light beam of said headlamp.

11. The detection device according to claim 10, wherein said detection device comprises a DBL device which is associated with said headlamp of said vehicle, said at least one camera being coupled kinematically to the DBL device.

12. A device for a motor vehicle having at least one dynamic bending light that is coupled to and under the control of a dynamic bending light control, said device comprising:
   at least one camera that has a field of vision;
   a single mechanism that displaces or moves said dynamic bending light and said camera to displace a light beam, wherein said at least one camera is coupled to said mechanism by being at least one of fitted on said mechanism or directly coupled to said mechanism so that an orientation of said field of vision of said at least one camera is modified in response to a modification of said orientation of said light beam of said dynamic bending light.

13. The device as recited in claim 12 wherein said field of vision moves to follow an orientation of a beam emitted by said at least one dynamic bending light.

\* \* \* \* \*